United States Patent
Chen et al.

(10) Patent No.: US 11,642,843 B2
(45) Date of Patent: May 9, 2023

(54) THREE-DIMENSIONAL PRINTING

(71) Applicant: Hewlett-Packard Development Company, L.P., Spring, TX (US)

(72) Inventors: Tienteh Chen, San Diego, CA (US); Allen Jin, San Diego, CA (US); Kenneth Flack, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 133 days.

(21) Appl. No.: 17/051,941

(22) PCT Filed: Jan. 18, 2019

(86) PCT No.: PCT/US2019/014102
§ 371 (c)(1),
(2) Date: Oct. 30, 2020

(87) PCT Pub. No.: WO2020/149848
PCT Pub. Date: Jul. 23, 2020

(65) Prior Publication Data
US 2021/0331385 A1    Oct. 28, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/194* (2017.08); *B33Y 10/00* (2014.12);
(Continued)

(58) Field of Classification Search
CPC ....... B29C 64/165; B33Y 10/00; B33Y 70/00; C08G 18/3206
See application file for complete search history.

(56) References Cited

U.S. PATENT DOCUMENTS

| 5,096,993 A | 3/1992 | Smith et al. |
| 9,982,164 B2 | 5/2018 | Rolland et al. |
(Continued)

FOREIGN PATENT DOCUMENTS

| CN | 107141437 | 9/2017 | |
| CN | 107880531 | 4/2018 | |
| WO | WO-2017188965 A1 * | 11/2017 | ........... B29C 64/165 |

*Primary Examiner* — Mary Lynn F Theisen
(74) *Attorney, Agent, or Firm* — HP Inc. Patent Department

(57) ABSTRACT

A materials kit for three-dimensional (3D) printing can include a powder bed material comprising thermoplastic polyurethane particles and a fusing agent including a radiation absorber to selectively apply to the powder bed material. The thermoplastic polyurethane particles can have an average particle size from about 20 μm to about 120 μm and a melting temperature of from about 100° C. to about 250° C., wherein the thermoplastic polyurethane particles include polyurethane polymer strands having an average of about 10 wt % to about 30 wt % hard segments based on a total weight of the thermoplastic polyurethane particles. The hard segments can include a symmetrical aliphatic diisocyanate and a symmetrical aliphatic chain extender that are polymerized into the thermoplastic polyurethane particles.

15 Claims, 3 Drawing Sheets

(51) Int. Cl.
    *B33Y 70/00*         (2020.01)
    *C08G 18/32*         (2006.01)
    *B29C 64/194*       (2017.01)
    *C08G 18/10*         (2006.01)
    *B29K 75/00*         (2006.01)
    *B29K 105/00*       (2006.01)

(52) U.S. Cl.
    CPC .............. *B33Y 70/00* (2014.12); *C08G 18/10* (2013.01); *C08G 18/3206* (2013.01); *C08G 18/3212* (2013.01); *C08G 18/3218* (2013.01); *B29K 2075/00* (2013.01); *B29K 2105/251* (2013.01)

(56) References Cited

U.S. PATENT DOCUMENTS

| | | | |
|---|---|---|---|
| 2017/0008233 A1 | 1/2017 | Vontorcik, Jr. et al. | |
| 2018/0009932 A1 | 1/2018 | Hearon et al. | |
| 2018/0111315 A1* | 4/2018 | Achten | B33Y 40/20 |
| 2018/0126631 A1 | 5/2018 | Nauka et al. | |
| 2018/0208706 A1* | 7/2018 | Green | C08G 18/3206 |
| 2018/0291141 A1* | 10/2018 | Yang | C08G 18/10 |
| 2019/0299494 A1* | 10/2019 | Prissok | C08K 5/11 |
| 2019/0344497 A1* | 11/2019 | Achten | C08G 64/04 |
| 2020/0047410 A1* | 2/2020 | Achten | B29C 64/153 |
| 2020/0307073 A1* | 10/2020 | Achten | B29C 64/153 |
| 2020/0307076 A1* | 10/2020 | Achten | C08G 18/7671 |
| 2020/0406537 A1* | 12/2020 | Cross | C08J 5/00 |
| 2022/0016832 A1* | 1/2022 | Tjellesen | B22F 12/67 |

\* cited by examiner

THREE-DIMENSIONAL PRINTING

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

DETAILED DESCRIPTION

Figure 1:
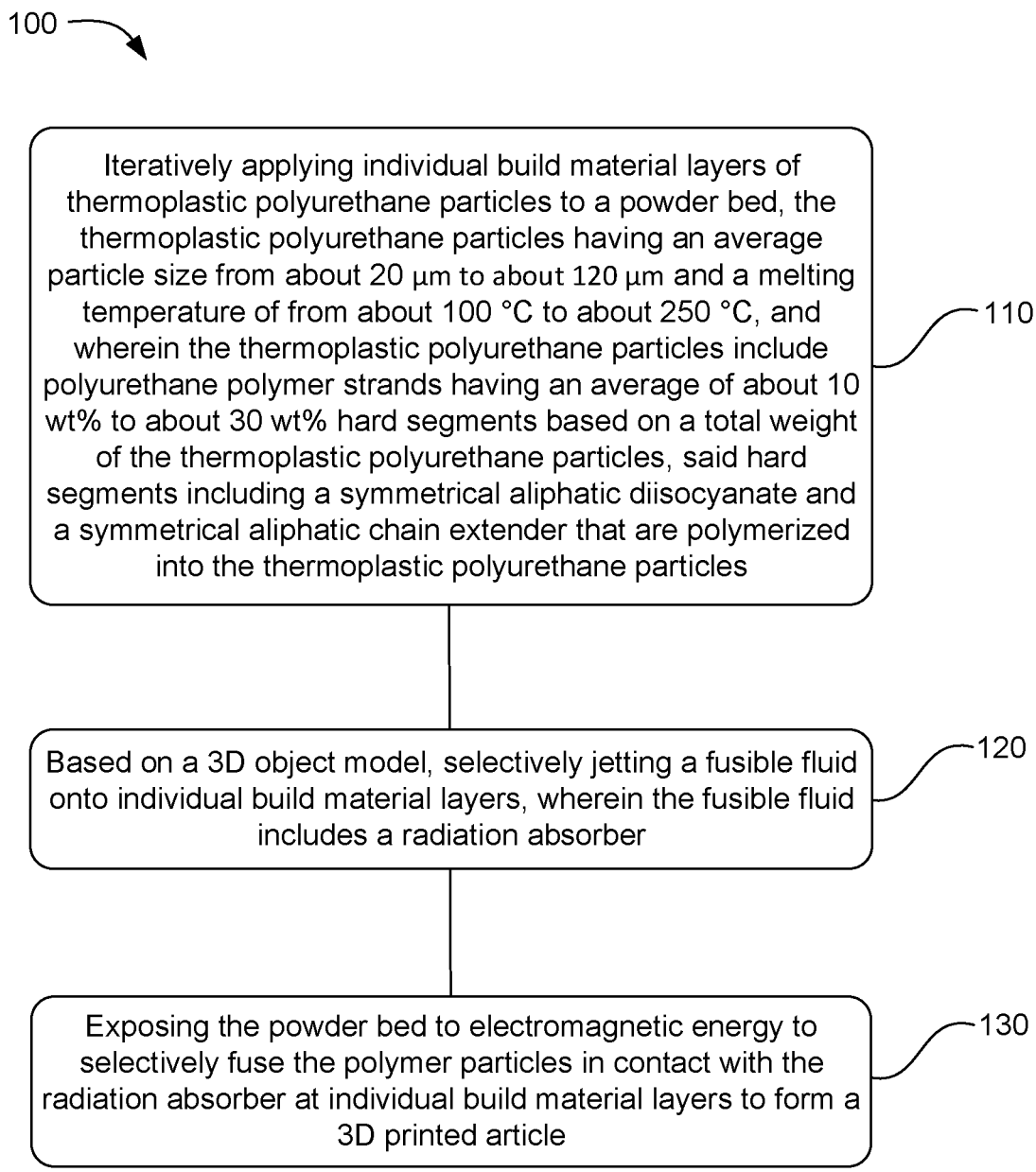
FIG. 1 is a flowchart illustrating an example method of making a 3D printed article in accordance with the present disclosure.

The present disclosure describes material kits for three-dimensional printing (3D) printing and methods of making 3D printed articles that include a thermoplastic polyurethane build material. In one example, a materials kit for 3D printing can include a powder bed material including thermoplastic polyurethane particles and a fusing agent including a radiation absorber to selectively apply to the powder bed material. The thermoplastic polyurethane particles can have an average particle size from about 20 μm to about 120 μm and a melting temperature of from about 100° C. to about 250° C. The thermoplastic polyurethane particles can include polyurethane polymer strands having an average of about 10 wt % to about 30 wt % hard segments based on a total weight of the thermoplastic polyurethane particles. The hard segments can include a symmetrical aliphatic diisocyanate and a symmetrical aliphatic chain extender that are polymerized into the thermoplastic polyurethane particles. In some examples, the polyurethane strands can have a weight average molecular weight of from about 50,000 Mw to about 1,000,000 Mw. In still other examples, the symmetrical aliphatic diisocyanate has a structure:

$$O=C=N-R_1-N=C=O$$

where $R_1$ is a saturated linear or cyclic alkyl group having an even number of carbon atoms from 2 to 12. In some other examples, the symmetrical aliphatic diisocyanate can include 1,6-hexanediisocyanate, 1,4-cyclohexyldiisocyanate, or a combination thereof. In some further examples, the symmetrical aliphatic chain extender has a structure:

$$HO-R_2-OH$$

where $R_2$ is a saturated linear or cyclic alkyl group having an even number of carbon atoms from 2 to 12. In some other examples, the symmetrical aliphatic chain extender can include 1,4-butanediol, 1,6-hexanediol, 1,4-cyclohexyldimethylol, or a combination thereof. In some additional examples, the thermoplastic polyurethane particles further include polyurethane polymer strands having a soft segment polymerized from poly(tetrahydrofuran) polyol, poly(carbonate) polyol, poly(ester-co-carbonate) polyol, polyester polyol, polybutadiene polyol, and poly(isobutylene) polyol. Most preferred polyols are poly(tetrahydrofuran) polyol, poly(carbonate) polyol, poly(ester-co-carbonate) polyol, poly(butadiene) polyol, or a combination thereof.

In another example, a materials kit for 3D printing can include a powder bed material including thermoplastic polyurethane particles, a fusing agent including a radiation absorber to selectively apply to the powder bed material, and a detailing agent including a detailing compound to selectively apply to the powder bed material. The thermoplastic polyurethane particles can have an average particle size from about 20 μm to about 120 μm and a melting temperature of from about 100° C. to about 250° C. The thermoplastic polyurethane particles can include polyurethane polymer strands having an average of about 10 wt % to about 30 wt % hard segments based on a total weight of the thermoplastic polyurethane particles. The hard segments can include a symmetrical aliphatic diisocyanate and a symmetrical aliphatic chain extender that are polymerized into the thermoplastic polyurethane particles. In some examples, the thermoplastic polyurethane particles include from about 80 wt % to about 100 wt % of the powder bed material based on a total weight of the powder bed material. In some additional examples, the radiation absorber includes carbon black, a near-infrared absorbing dye, a near-infrared absorbing pigment, a tungsten bronze, a molybdenum bronze, metal nanoparticles, a conjugated polymer, or a combination thereof. In some further examples, the detailing compound is capable of reducing a temperature of polymer powder onto which the detailing agent is applied when the powder bed material is exposed to photoactive energy photochemically interactive with the radiation absorber.

In some additional examples, a method of making a 3D printed article can include iteratively applying individual build material layers of thermoplastic polyurethane particles to a powder bed, based on a 3D object model, selectively jetting a fusing agent onto individual build material layers, where the fusing agent comprises a radiation absorber, and exposing the powder bed to electromagnetic energy to selectively fuse the polymer particles in contact with the radiation absorber at individual build material layers to form a 3D printed article. The thermoplastic polyurethane particles can have an average particle size from about 20 μm to about 120 μm and a melting temperature of from about 100° C. to about 250° C. The thermoplastic polyurethane particles can include polyurethane polymer strands having an average of about 10 wt % to about 30 wt % hard segments based on a total weight of the thermoplastic polyurethane particles. The hard segments can include a symmetrical aliphatic diisocyanate and a symmetrical aliphatic chain extender that are polymerized into the thermoplastic polyurethane particles. In some examples, the method can further include selectively jetting a detailing agent onto individual build material layers at a location adjacent to the fusing agent where fusing is not desired based on the 3D object model, where the detailing agent includes a detailing compound. In some additional examples, the symmetrical aliphatic diisocyanate can include 1,6-hexanediisocyanate, 1,4-cyclohexyldiisocyanate, or a combination thereof and the symmetrical aliphatic chain extender can include 1,4-butanediol, 1,6-hexanediol, 1,4-cyclohexyldimethylol, or a combination thereof. In some further examples, the 3D printed article has a tensile strength of from about 20 Megapascals (MPa) to about 50 MPa and a percent elongation at break of from about 1000% to about 4000%.

In addition to the examples described above, the materials kits and methods of manufacturing will be described in greater detail below. It is also noted that when discussing the materials kits and methods of manufacturing described herein, these relative discussions can be considered applicable to the other examples, whether or not they are explicitly discussed in the context of that example. Thus, for example, in discussing a thermoplastic polyurethane related to a materials kit, such disclosure is also relevant to and directly supported in the context of the methods of manufacturing described herein, and vice versa.

Methods of Making 3D Printed Articles

In various examples, the 3D printed articles described herein can be formed from a thermoplastic polyurethane powder build material using a process that involves jetting a fusing agent onto layers of the polymer powder and then fusing the powder using electromagnetic energy. FIG. 1 is a flowchart illustrating one example method 100 of making a 3D printed article. The method includes iteratively applying 110 individual build material layers of thermoplastic polyurethane particles to a powder bed, and, selectively jetting 120 a fusing agent onto individual build material layers. The fusing agent includes a radiation absorber in this example, and the jetting is based on a 3D object model. The method also includes exposing 130 the powder bed to electromagnetic energy to selectively fuse the polymer particles in contact with the radiation absorber at individual build material layers to form a 3D printed article. The thermoplastic polyurethane particles can have an average particle size from about 20 μm to about 120 μm and a melting temperature of from about 100° C. to about 250° C., about 120° C. to about 200° C., or about 140° C. to about 180° C., and the thermoplastic polyurethane particles can include polyurethane polymer strands having an average of about 10 wt % to about 30 wt % hard segments based on a total weight of the thermoplastic polyurethane particles. In another example, the polyurethane polymer strands can have an average of about 12 wt % to about 28 wt %, about 15 wt % to about 25 wt %, about 15 wt % to about 30 wt %, about 10 wt % to about 25 wt %, or about 20 wt % to about 30 wt % hard segments, for example. The hard segments can include a symmetrical aliphatic diisocyanate and a symmetrical aliphatic chain extender that are polymerized into the thermoplastic polyurethane particles.

As mentioned above, the 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area where the fusing agent is to be printed. Other information may also be included, such as structures to be formed of additional different materials or color data for printing the article with various colors at different locations on the article. The 3D object model may also include features or materials specifically related to fluid agents, e.g., fusing agent(s), detailing agent(s), inks, etc., on layers of powder bed material, such as the desired amount of fluid agent to be applied to a given area. This information may be in the form of a droplet saturation, for example, which can instruct a 3D printing system to jet a certain number of droplets of fluid agent into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of thermoplastic polyurethane powder can be spread on a bed to form a powder bed. At the beginning of the process, the powder bed can be empty because no thermoplastic polyurethane particles have been spread at that point. For the first layer, the thermoplastic polyurethane particles can be spread onto an empty build platform. The build platform can be a flat surface made of a material sufficient to withstand the heating conditions of the 3D printing process, such as a metal. Thus, "applying individual build material layers of thermoplastic polyurethane particles to a powder bed" includes spreading thermoplastic polyurethane particles onto the empty build platform for the first layer. In other examples, a number of initial layers of thermoplastic polyurethane powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of thermoplastic polyurethane powder can be spread over the powder bed and the process can be repeated to form additional layers until a complete 3D article is printed. Thus, "applying individual build material layers of thermoplastic polyurethane particles to a powder bed" also includes spreading layers of thermoplastic polyurethane particles over the loose particles and fused layers beneath the new layer of thermoplastic polyurethane particles.

In some examples, a detailing agent can be used together with the fusing agent. The detailing agent can be a fluid that reduces the maximum temperature of the thermoplastic polyurethane powder on which the detailing agent is printed. In particular, the maximum temperature reached by the powder during exposure to electromagnetic energy can be less in the areas where the detailing agent is applied. In certain examples, the detailing agent can include a solvent that evaporates from the thermoplastic polyurethane powder to evaporatively cool the thermoplastic polyurethane powder. The detailing agent can be printed in areas of the powder bed where fusing is not desired. In particular examples, the detailing agent can be printed along the edges of areas where the fusing agent is printed. This can give the fused layer a clean, defined edge where the fused thermoplastic polyurethane particles end and the adjacent thermoplastic polyurethane particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas.

Figure 2:
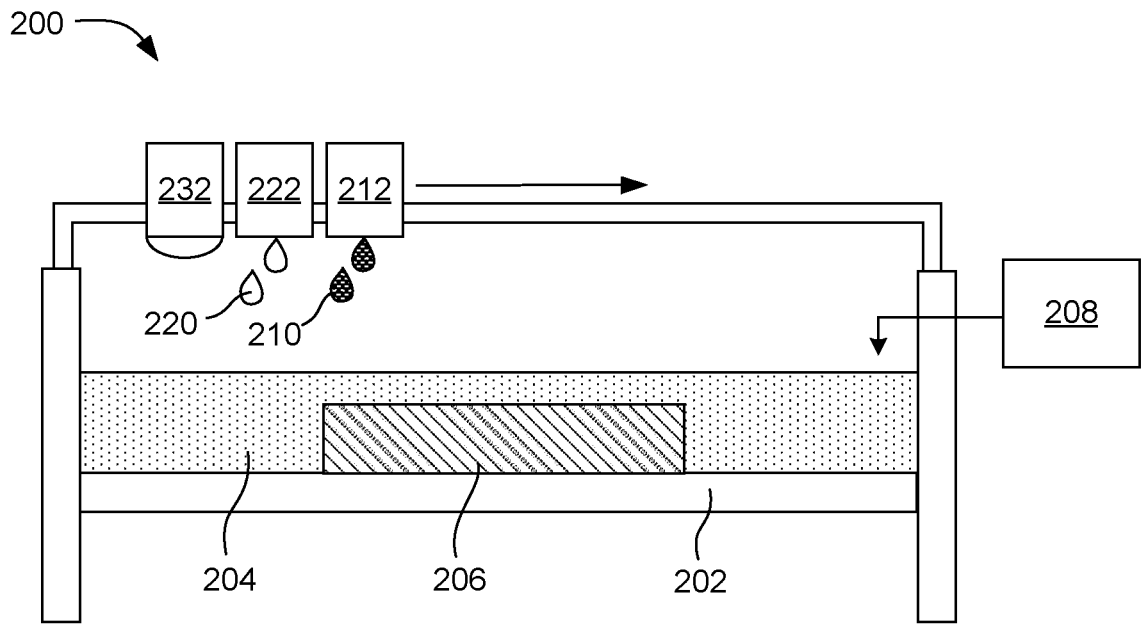
FIG. 2 is a schematic view of an example 3D printing system in accordance with the present disclosure.
Figure 3:
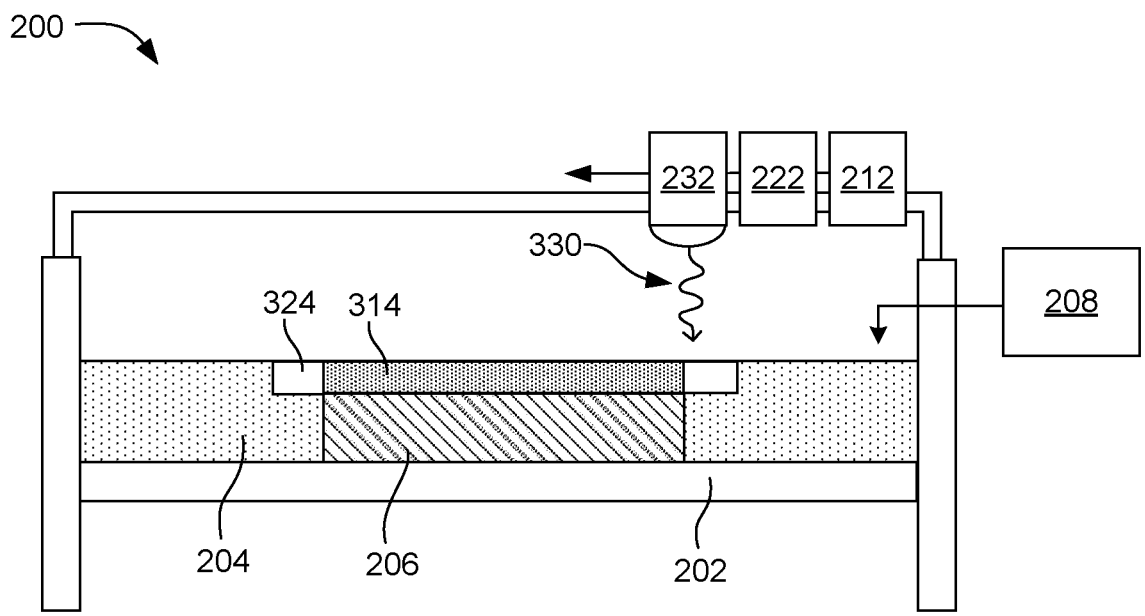
FIG. 3 is another schematic view of an example 3D printing system in accordance with the present disclosure.
Figure 4:
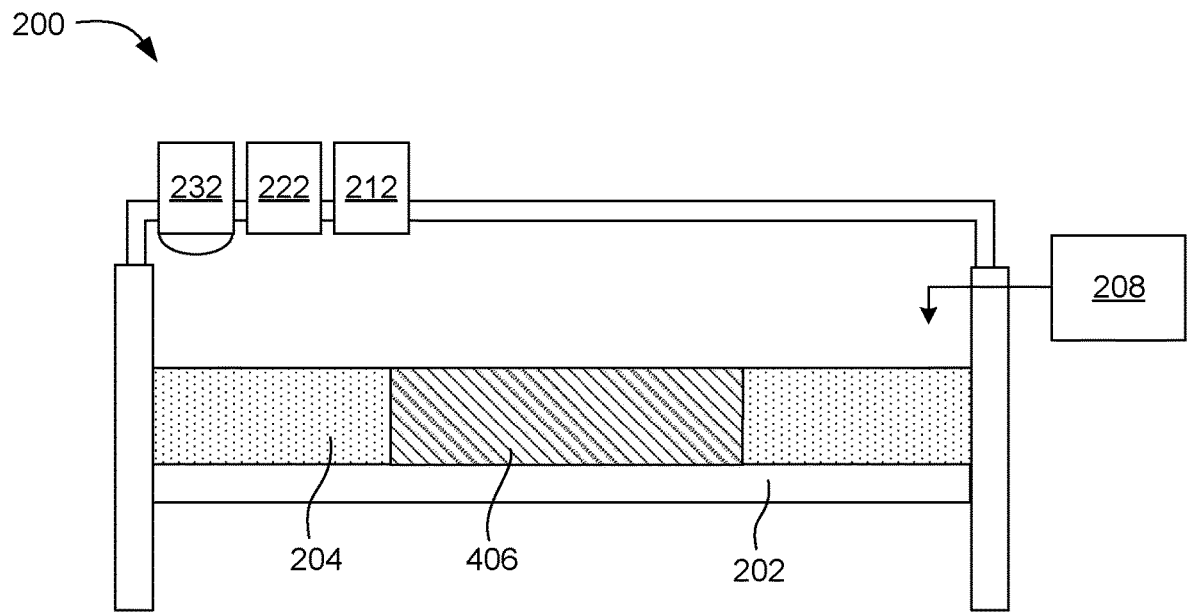
FIG. 4 is another schematic view of an example 3D printing system in accordance with the present disclosure.

FIGS. 2-4 illustrate one example method of making a 3D printed article. FIG. 2 shows a 3D printing system 200 that includes a build platform 202 supporting a powder bed of build material powder 204. A partially printed article 206 is made up of fused build material powder in the powder bed. This figure shows a cross-sectional view of the partially printed article and the powder bed. A layer of fresh build material powder is supplied from a build material supply 208 over the top of the partially printed article. Fluid agents are applied to the layer of fresh build material, including fusing agent 210 from a fusing agent fluid jet 212 and a detailing agent 220 from a detailing agent fluid jet 222. The fluid jets are moveable within the printing system so that the fluid jets can move across the powder bed to apply the fluid agents in specific, desired locations. The system also includes an electromagnetic energy source 232.

FIG. 3 shows the 3D printing system 200 after the fluid agents have been jetted onto portions of the fresh build material powder 204. The top layer of build material now includes areas jetted with detailing agent 324 and areas jetted with fusing agent 314. Generally, the fusing agent can be jetted in all areas where the polymer powder is to be fused to form a solid material. The powder bed can be exposed to electromagnetic energy 330 from an energy source 232, such as an infrared lamp.

FIG. 4 shows the 3D printing system 200 after fusing the top layer to form a surface layer and complete a 3D printed article 406. The surface layer includes a fused area forming part of the complete 3D printed article and an area of unfused powder bed material 204.

As mentioned above, individual layers of the 3D printed article can be formed by fusing the thermoplastic polyurethane powder build material. A fusing agent can be applied to the thermoplastic polyurethane powder in areas to be fused, while a detailing agent can be applied to areas to be cooled. These fluid agents are described in more detail below. 3D printing systems used to perform these printing methods can include an electromagnetic energy source to apply electromagnetic energy to fuse the polymer powder printed with the fusing agent. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the radiation absorber. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the radiation absorber printed thereon, while the unprinted polymer particles do not absorb as much light and remain at a lower temperature.

In some examples, the three-dimensional printing system can also include preheaters for preheating the thermoplastic polyurethane powder to a temperature near the fusing temperature. In one example, the system can include a print bed heater to heat the print bed during printing. The preheat temperature used can depend on the specific thermoplastic polyurethane used. In some examples, the print bed heater can heat the print bed to a temperature from about 50° C. to about 250° C., about 80° C. to about 200° C., or about 100° C. to about 180° C. The system can also include a supply bed, where thermoplastic polyurethane particles can be stored before being spread in a layer onto the print bed. The supply bed can have a supply bed heater. In some examples, the supply bed heater can heat the supply bed to a temperature from about 80° C. to about 140° C., or about 90° C. to about 130° C.

Depending on the amount of radiation absorber present in the thermoplastic polyurethane powder, the absorbance of the radiation absorber, the preheat temperature, and the fusing temperature of the specific thermoplastic polyurethane, an appropriate amount of irradiation can be supplied from the electromagnetic energy source or fusing lamp. In some examples, the fusing lamp can irradiate each layer from about 0.1 to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

Materials Kits for 3D Printing

Figure 5:
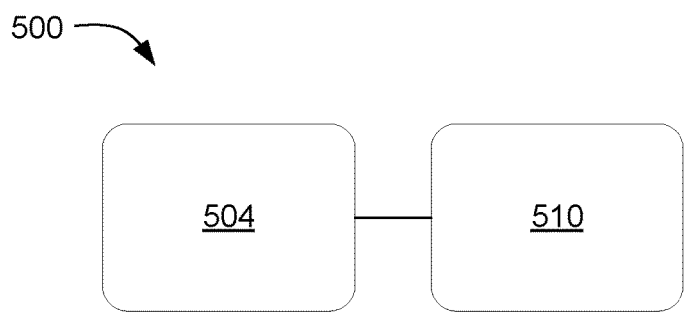
FIG. 5 is a schematic view of an example materials kit for 3D printing in accordance with the present disclosure.

The present disclosure also extends to materials kits for 3D printing that can include the fluid agents and build material used to perform the 3D printing methods described above. FIG. 5 shows an example materials kit 500 for 3D printing that includes a powder bed material 504 and a fusing agent 510. The powder bed material can include thermoplastic polyurethane particles having an average particle size from about 20 μm to about 120 μm and a melting temperature of from about 100° C. to about 250° C., about 120° C. to about 200° C., or about 140° C. to about 180° C., and wherein the thermoplastic polyurethane particles include polyurethane polymer strands having an average of about 10 wt % to about 30 wt % hard segments based on a total weight of the thermoplastic polyurethane particles. In another example, the polyurethane polymer strands can have an average of about 12 wt % to about 28 wt %, about 15 wt % to about 25 wt %, about 15 wt % to about 30 wt %, about 10 wt % to about 25 wt %, or about 20 wt % to about 30 wt % hard segments, for example. In some examples, the fusing agent can include water and a radiation absorber. These materials can be used in 3D printing methods and systems as described above to form 3D printed articles. In particular, the fusing agent can be selectively applied to the powder bed material and layers of the powder bed material can be fused to form a 3D printed article.

Figure 6:
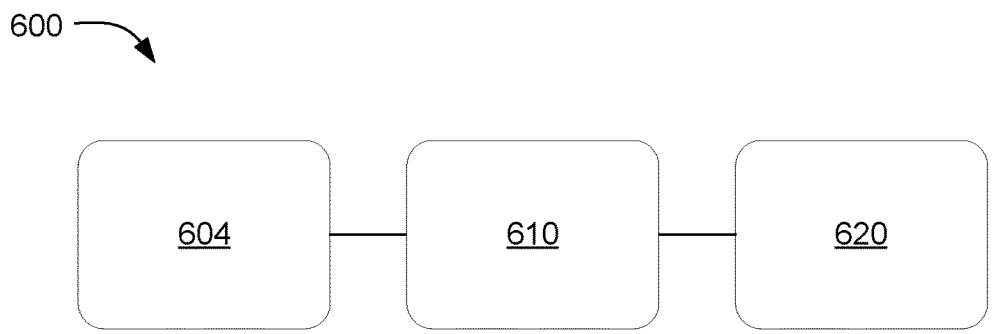
FIG. 6 is a schematic view of another example materials kit for 3D printing in accordance with the present disclosure.

FIG. 6 shows another example materials kit 600 for 3D printing including a powder bed material 604, a fusing agent 610, and a detailing agent 620. The powder bed material and the fusing agent are generally described above in the context of FIG. 5. The detailing agent can include a detailing compound. The detailing compound can be capable of reducing the maximum temperature of thermoplastic polyurethane powder onto which the detailing agent is applied.

In some examples, the materials kit for 3D printing can include powder bed material and a fusing agent packaged together. In other examples, the materials kit for 3D printing can include a powder bed material, a fusing agent, and a detailing agent packaged together. In certain examples, the powder bed material can be in the form of a container or bag of loose powder material. In other examples, the powder bed material can be in a cartridge designed to fit in a specific 3D printing system. Similarly, the fusing agent and detailing agent can be in cartridges designed for use with a specific 3D printing system, or the fluid agents can be in another package such as bottles.

Powder Bed Materials

In certain examples, the powder bed material can include thermoplastic polyurethane particles having a variety of shapes, such as substantially spherical particles or irregularly-shaped particles. In some examples, the polymer powder can be capable of being formed into 3D printed parts with a resolution of about 20 μm to about 100 μm, about 30 μm to about 90 μm, or about 40 μm to about 80 μm. As used herein, "resolution" refers to the size of the smallest feature that can be formed on a 3D printed part. The thermoplastic polyurethane powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the thermoplastic polyurethane powder can have an average particle size from about 20 μm to about 100 μm. In other examples, the average particle size can be from about 20 μm to about 50 μm. Other resolutions along these axes can be from about 30 μm to about 90 μm, or from 40 μm to about 80 μm.

The thermoplastic polyurethane powder can generally include polyurethane strands having a weight average molecular weight of from about 50,000 Mw to about 1,000,000 Mw. In other examples, the thermoplastic polyurethane powder can include polyurethane strands having a weight average molecular weight of from about 100,000 Mw to about 1,000,000 Mw, from about 150,000 Mw to about 800,000 Mw, or from about 200,000 Mw to about 600,000 Mw.

The thermoplastic polyurethane powder can have a melting or softening point from about 100° C. to about 250° C. In further examples, the thermoplastic polyurethane can have a melting or softening point from about 120° C. to about 200° C., or about 140° C. to about 180° C. It is noted that the majority of thermoplastic polyurethanes do not have a sharp melting point, but have a melting range that is too broad for the printing methods described herein. However, the thermoplastic polyurethanes described herein can have a sharp melting point within the ranges specified above.

Thermoplastic polyurethanes are generally polymerized from a polyol, a diisocyanate, and a chain extender. The polymerized polyurethane strand can include soft segments and hard segments. The "soft segments" can be formed by the higher molecular weight polymerized polyol groups, which are generally mobile and can be present in a variety of formations, such as a coiled formation, for example. The "hard segments" can be formed by the lower molecular weight polymerized diisocyantes and chain extenders, which are generally stiff and immobile. Thus, the "soft segments" provide elasticity, whereas the "hard segments" contribute strength and rigidity through physical cross-linking points. High order packing of the "hard segments" can provide the present thermoplastic polyurethane particles with good crystallinity characteristics. Thus the weight percent "hard segment" of the thermoplastic polyurethane refers to the sum of the weight percentages of the diisocyanate component and the chain extender component in the thermoplastic polyurethane.

In further detail, thermoplastic polyurethane particles having a sharp melting point within the ranges specified above can generally include polyurethane polymer strands having an average of about 10 wt % to about 30 wt % hard segments based on a total weight of the thermoplastic polyurethane particles. In other examples, the thermoplastic polyurethane particles having a sharp melting point within the ranges specified above can include polyurethane polymer strands having an average of about 12 wt % to about 28 wt %, about 15 wt % to about 25 wt %, about 15 wt % to about 30 wt %, about 10 wt % to about 25 wt %, or about 20 wt % to about 30 wt % hard segments based on a total weight of the thermoplastic polyurethane particles. Thermoplastic polyurethanes having hard segment content within the specified range can generally provide 3D printed parts with good mechanical properties. For example, in some cases, thermoplastic polyurethanes having hard segment proportions within the specified range can provide 3D printed parts having a tensile strength (at maximum load) of from about MPa to about 50 MPa. In some additional examples, thermoplastic polyurethanes having hard segment proportions within the specified range can provide 3D printed parts having a percent elongation at break of from about 1000% to about 4000%. "Elongation at break" can be based on a percentage of increased length compared to the initial length (along the longest initial axis prior to stretch). Thus, a 1000% stretch at break would indicate a printed object can be stretched to about ten times its original length before the object breaks.

Additionally, thermoplastic polyurethane particles having a sharp melting point within the ranges specified above can generally have hard segments including symmetrical aliphatic diisocyanates that are polymerized into the thermoplastic polyurethane particles. Thus, the diisocyanates polymerized into the thermoplastic polyurethane particles do not include aromatic groups. For example, in some cases, the symmetrical aliphatic diisocyanate can have a structure:

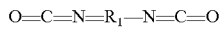

where $R_1$ is a saturated linear or cyclic alkyl group having an even number of carbon atoms from 2 to 12. In some examples, $R_1$ can be a saturated linear alkyl group. In other examples, $R_1$ can be or include a saturated cyclic alkyl group. In some additional examples, $R_1$ can have an even number of carbon atoms from 4 to 8. It is noted that $R_1$ is generally unsubstituted, such that it is non-polar or otherwise does not include nitrogen, sulfur, oxygen, or other reactive groups that may interact with other segments of the thermoplastic polyurethane strand to deteriorate the crystallinity thereof. In some specific examples, the symmetrical aliphatic diisocyanate can include 1,6-hexanediisocyanate, 1,4-cyclohexyldiisocyanate, the like, or a combination thereof.

Further, thermoplastic polyurethane particles having a sharp melting point within the ranges specified above can generally have hard segments including symmetrical aliphatic chain extenders that are polymerized into the thermoplastic polyurethane particles. Thus, the chain extenders polymerized into the thermoplastic polyurethane particles also do not include aromatic groups. In some examples, the symmetrical aliphatic chain extender can have a structure:

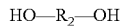

where $R_2$ is a saturated linear or cyclic alkyl group having an even number of carbon atoms from 2 to 12. In some examples, $R_2$ can be a saturated linear alkyl group. In other examples, $R_2$ can be or include a saturated cyclic alkyl group. In some additional examples, $R_2$ can have an even number of carbon atoms from 4 to 8. It is noted that $R_2$ is generally unsubstituted, such that it is non-polar or otherwise does not include nitrogen, sulfur, oxygen, or other reactive groups that may interact with other segments of the thermoplastic polyurethane strand to deteriorate the crystallinity thereof. In some specific examples, the symmetrical aliphatic chain extender can include 1,4-butanediol, 1,6-hexanediol, 1,4-cyclohexyldimethylol, the like, or a combination thereof.

It is noted that both the diisocyanate and the chain extender can be symmetrical aliphatic groups. In some examples, where only one of the diisocyanate and the chain extender is a symmetrical aliphatic group, the melting point of the thermoplastic polyurethane can become overly broad, rather than sharp, which is not suitable for the present printing methods. In some additional examples, where neither the diisocyanate nor the chain extender are symmetrical aliphatic groups, the thermoplastic polyurethane can become amorphous and non-crystalline, which is also not suitable for the present printing methods.

The polyols of the soft segment can generally be hydrophobic polyols. Hydrophilic polyols can interact with the urethane functional groups to deteriorate the crystalline morphology of the thermoplastic polyurethane particles and broaden the melting point thereof. Non-limiting examples of hydrophobic polyols from which the soft segment of the polyurethane strands can be polymerized can include poly (tetrahydrofuran) polyol, poly(carbonate) polyol, poly(ester-co-carbonate) polyol, polyester polyol, polybutadiene polyol, and poly(isobutylene) polyol. Most preferred polyols are poly(tetrahydrofuran) polyol, poly(carbonate) polyol, poly(ester-co-carbonate) polyol, poly(butadiene) polyol, or a combination thereof. The polyol polymers from which the soft segment can be polymerized can generally have a weight average molecular weight of from about 500 Mw to about 4000 Mw. In other examples, the polyol polymers from which the soft segment can be polymerized can have a weight average molecular weight of from about 500 Mw to about 1500 Mw, from about 1500 Mw to about 2500 Mw, or from about 2500 Mw to about 4000 Mw.

The thermoplastic polyurethane particles can also in some cases be blended with a filler. The filler can include inorganic particles such as alumina, silica, or combinations thereof. When the thermoplastic polyurethane particles fuse together, the filler particles can become embedded in the thermoplastic polyurethane, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polyurethane particles to filler particles can be from about 10:1 to about 1:2 or from about 5:1 to about 1:1. In some specific examples, the thermoplastic polyurethane particles can include from about 80 wt % to about 100 wt % of the powder bed material based on a total weight of the powder bed material. In another example, the thermoplastic polyurethane particles can include from about 80 wt % to 99.99 wt %, about 80 wt % to about 99.9 wt %, about 90 wt % to about 100 wt %, from about 95 wt % to about 100 wt %, from about 99 wt % to about 100 wt %, from about 80 wt % to about 99 wt %, from about 80 wt % to about 95 wt %, or from about 90 wt % to about 99 wt % of the powder bed material. In some examples, the filler may be excluded, or can include from about 0.01 wt % to about 20 wt % of the powder bed material based on a total weight of the powder bed material. In other examples, the filler can be included at from about 0.1 wt % to about 20 wt %, about 1 wt % to about 20 wt %, about 0.1 wt % to about 10 wt %, or about 0.01 wt % to about 5 wt %, for example.

Fusing Agents

In further examples, the fusing agent can include a liquid vehicle and a radiation absorber that is capable of absorbing electromagnetic radiation to produce heat. The radiation absorber can be colored or colorless. In various examples, the radiation absorber can be glass fiber, titanium dioxide, clay, mica, talc, barium sulfate, calcium carbonate, a near-infrared absorbing dye, a near-infrared absorbing pigment, a dispersant, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm, or about 900 nm to about 1300 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is printed onto the thermoplastic polyurethane powder, the amount of radiation absorber in the thermoplastic polyurethane powder can be from about 0.0003 wt % to about 10 wt %, or from about 0.005 wt % to about 5 wt %, with respect to the weight of the thermoplastic polyurethane powder.

Detailing Agents

The detailing agent can include a liquid vehicle and detailing compound capable of cooling the thermoplastic polyurethane powder in portions of the powder bed onto which the detailing agent is printed. In some instances, the detailing compound can be a liquid solvent, a dispersed solid, or a dissolved solid in the detailing agent, or in other cases, the detailing compound can be the detailing agent, e.g., 100 wt % water. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases, the powder bed can be preheated to a preheat temperature within about 10° C. to about 70° C., within about 20° C. to about 50° C., or within about 10° C. to about 40° C., of the fusing temperature of the thermoplastic polyurethane powder. Depending on the specific thermoplastic polyurethane powder used, the preheat temperature can be in the range of about 90° C. to about 200° C., about 100° C. to about 180° C., or about 120° C. to about 180° C. Thus, the detailing compound can be a solvent that evaporates when it comes into contact with the powder bed at the preheat temperature, thereby cooling the printed portion of the powder bed through evaporative cooling. In certain examples, the detailing compound can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, or combinations thereof. In some examples, the detailing agent can be mostly water. In a particular example, the detailing agent can be about 85 wt % water or more. In further examples, the detailing agent can be about 95 wt % water or more. In another example, the detailing agent can be 100 wt % water, and in this instance, the water compound is the detailing compound. In still further examples, the detailing compound can be substantially devoid of radiation absorbers. That is, in some examples, the detailing compound can be substantially devoid of ingredients that absorb enough energy from the light source to cause the powder to fuse. In certain examples, the detailing agent can include colorants such as dyes or pigments, but in small enough amounts that the colorants do not cause the powder printed with the detailing agent to fuse when exposed to the light source.

Liquid Vehicles

The components of the above described fluid agents, e.g., fusing agents and detailing agents, can be selected to give the respective fluid agents good fluid jetting performance and the ability to fuse the polymer bed material. Thus, these fluid agents can include a liquid vehicle. In some examples, the liquid vehicle formulation can include a co-solvent or co-solvents present in total at from about 1 wt % to about 50 wt %, about 2 wt % to about 40 wt %, about 4 wt % to about 30 wt %, or about 5 wt % to about 20 wt %, for example. Further, a non-ionic, cationic, and/or anionic surfactant can be present, ranging from about 0.01 wt % to about 5 wt %. In certain examples, the surfactant can be present in an amount from about 0.01 wt % to about 20 wt %, about 0.1 wt % to about 10 wt %, about 1 wt % to about 5 wt %, from 1 wt % to 4 wt %, or from 0.1 wt % to 3 wt %, for example. The liquid vehicle can include dispersants in an amount from about 0.1 wt % to about 5 wt %, about 0.3 wt % to about 3 wt %, or from 0.5 wt % to about 2 wt %. Example surfactant or surfactants that can be used include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Other suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluid agents can be substantially free of organic solvent, e.g., predominantly water. However, in other examples a co-solvent can be used to help disperse other dyes or pigments, or enhance the jetting properties of the respective fluid agents. In still further examples, a non-aqueous vehicle can be used with an organic-soluble or organic-dispersible radiation absorber.

In certain examples, a high boiling point co-solvent can be included in the various fluid agents. The high boiling point co-solvent can be an organic co-solvent that boils at a temperature higher than the temperature of the powder bed during printing. The high boiling point co-solvent can be defined as having a boiling point above about 250° C. In further detail, the high boiling point co-solvent can be present in the various fluid agents at a concentration from about 0.5 wt % to about 5 wt %, from about 1 wt % to about 4 wt %, or from about 1.5 wt % to about 3 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Consistent with the formulations of this disclosure, as mentioned, various other additives can be employed to enhance certain properties of the fluid agents for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc., New Jersey), UCAR-CIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid agent. From about 0.01 wt % to about 2 wt %, for example, can be used. Viscosity modifiers and buffers may also be present, as well as other additives to modify properties of the agent, e.g., fusing agent and/or detailing agent, etc., as desired. Such additives can be present at from about 0.01 wt % to about 20 wt %.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented materials kits and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be acceptable examples.

Example 1—Preparation of Thermoplastic Polyurethanes

The Thermoplastic Polyurethanes (TPU) for the examples herein were prepared in accordance with the following procedures: First, a diisocyanate, polyol, and tertiary amine catalyst were mixed by a Flack speed mixer in a plastic bottle. The plastic bottle was capped and heated in an 80° C. oven for four (4) hours to generate a prepolymer. The prepolymer was then cooled to below 45° C., followed by introduction of a chain extender. The mixture was again mixed with the Flack speed mixer to obtain a homogeneous mixture of the prepolymer and the chain extender. The mixture was then poured into a baking cup and covered with aluminum foil and cured at 100° C. overnight to form a cured thermoplastic polyurethane (TPU).

Example 2—Chain Extender Evaluation

Various thermoplastic polyurethanes were prepared to determine melting point characteristics. All thermoplastic polyurethanes in this example were prepared with a common diisocyanate: 1,6-hexane diisocyanate (HDI). Various polyols and chain extenders were used as presented in Table 1 below:

TABLE 1

Melting Points with Various Chain Extenders

| TPU ID | Diisocyanate | Polyol | Chain Extender | % HS | Melting Point (peak, in ° C.) |
|---|---|---|---|---|---|
| TPU-1 | 1,6-hexane diisocyanate (HDI) | PTMG1K | Cyclohexyl Dimethylol (CHDM) | 30 | 123 |
| TPU-2 | HDI | PTMG1K | 1,6-hexanediol (1,6-HD) | 30 | 122 |
| TPU-3 | HDI | PTMG1K | 1,4-butanediol (1,4-BD) | 30 | 122.9 |
| TPU-4 | HDI | PTMG1K | 1,8-octanediol | 30 | 123.7 |
| TPU-5 | HDI | PTMG1K | 3,6-dithia-1,8-octanediol | 30 | NA |
| TPU-6 | HDI | PTMG1K | Diethanolamine (DEA) | 30 | NA |
| TPU-7 | HDI | PTMG1K | Thiodiethanol | 30 | NA |
| TPU-8 | HDI | PTMG1K | Methyl-propanediol (MP Diol) | 30 | NA |
| TPU-9 | HDI | UH100 | CHDM | 30 | 116 |
| TPU-10 | HDI | UH100 | 1,6-HD | 30 | 118 |
| TPU-11 | HDI | UH100 | 1,4-BD | 30 | 129 |
| TPU-12 | HDI | UH100 | DEA | 30 | NA |
| TPU-13 | HDI | UM90 | CHDM | 30 | 103 |
| TPU-14 | HDI | UM90 | 1,6-HD | 30 | 113.7 |
| TPU-15 | HDI | UM90 | 1,4-BD | 30 | 111.6 |
| TPU-16 | HDI | UM90 | DEA | 30 | NA |
| TPU-17 | HDI | HLBH P 2000 | CHDM | 25 | 175.4 |
| TPU-18 | HDI | HLBH P 2000 | CHDM | 30 | 175.4 |
| TPU-19 | HDI | HLBH P 2000 | CHDM | 40 | 179.3 |
| TPU-20 | HDI | HLBH P 2000 | 1,6-HD | 25 | 156.9 |
| TPU-21 | HDI | HLBH P 2000 | 1,6-HD | 30 | 162.7 |
| TPU-22 | HDI | HLBH P 2000 | 1,6-HD | 40 | 165 |
| TPU-23 | HDI | LBH P2000 | 1,6-HD | 40 | 156.1 |
| TPU-24 | HDI | LBH PH2000 | CHDM | 40 | 177.2 |

% HS refers to the percent Hard Segment, calculated as the sum of wt % of diisocyanate with chain extenders.
PTMG1K is a poly(tetrahydrofuran) with MW of 1000 commercially available from Mitsubishi Chemical Corporation, Japan;
ETERNACOLL® UH100 (MW = 1000) is a wax polycarbonate polyol from UBE Chemical, Japan;
ETERNACOLL® UM90 is poly(ester-co-carbonate) polyol from UBE Chemical, Japan;
KRASOL® HLBH-P 2000 is a saturated aliphatic polyolefin polyol from Cray Valley USA LLC, USA; and KRASOL® LBH-P 2000 is a linear polybutadiene polyol from Cray Valley USA LLC, USA.

As can be seen in Table 1, of the thermoplastic polyurethanes tested, only those with symmetrical aliphatic chain extenders formed crystalline thermoplastic polyurethanes having sharp melting points. These included 1,4-butanediol, 1,6-hexanediol, 1,8-octanediol, and cyclohexyl dimethylol (CHDM). While DEA, thiodiethanol, and 3,6-dithia-1,8-octanediol are also symmetrical, they contain nitrogen and sulfur atoms in the middle of the compound that can interact with urethane group and destroy the regular packing of the hard segment. MP diol is not symmetrical 1,4-BD, 1,6-HD and CHDM were the most consistent in forming crystalline thermoplastic polyurethane regardless of the type of polyol with which they were polymerized.

Example 3—Diisocyanate Evaluation

Various thermoplastic polyurethanes were prepared with differing diisocyanates to determine how different types of diisocyanates impacted the melting point of the thermoplastic polyurethanes. Various symmetrical aliphatic chain extenders were combined with the diisocyanates to form thermoplastic polyurethanes having a hard segment of about 30 wt %, on average. ETERNACOLL® UH100 was used as the polyol. The melting points for the various thermoplastic polyurethanes are listed in Table 2 below:

TABLE 2

Melting Point with Various Diisocyanates

| TPU ID | Diisocyanate | Polyol | Chain Extender | % HS | Melting Point (peak, ° C.) |
|---|---|---|---|---|---|
| TPU-10 | HDI | UH100 | 1,6-HD | 30 | 118 |
| TPU-25 | Isophorone diisocyanate (IPDI) | UH100 | 1,6-HD | 30 | NA |
| TPU-26 | Methylene diphenyl diisocyanate (MDI) | UH100 | 1,6-HD | 30 | NA |
| TPU-27 | Hydrogenated MDI (HMDI) | UH100 | 1,6-HD | 30 | NA |
| TPU-11 | HDI | UH100 | 1,4-BD | 30 | 129 |
| TPU-28 | IPDI | UH100 | 1,4-BD | 30 | NA |
| TPU-30 | MDI | UH100 | 1,4-BD | 30 | NA |
| TPU-31 | HMDI | UH100 | 1,4-BD | 30 | NA |
| TPU-9 | HDI | UH100 | CHDM | 30 | 116 |
| TPU-32 | IPDI | UH100 | CHDM | 30 | NA |
| TPU-33 | MDI | UH100 | CHDM | 30 | NA |
| TPU-34 | HMDI | UH100 | CHDM | 30 | NA |

% HS refers to the percent Hard Segment, calculated as the sum of wt % of Diisocyanate with chain extenders.

As can be seen from Table 2, only the thermoplastic polyurethanes polymerized from symmetrical aliphatic diisocyanates, e.g. 1,6-HDI, in combination with the symmetrical chain extender (e.g 1,6-HD, 1,4-BD, CHDM) resulted in a thermoplastic polyurethane having crystalline properties and a sharp melting point (TPU-111, 94, 19). Unsymmetrical diisocyanates, such as IPDI, MDI, and HMDI, did not form crystalline thermoplastic polyurethanes with sharp melting points even though the chain extenders were symmetrical.

Example 4—Hard Segment Evaluation

Various thermoplastic polyurethanes were polymerized from UH100 polyol, HDI diisocyanate, and various chain extenders to have various weight percentages of hard segment, on average. The effect of % hard segment on melting point is present in Table 3 below:

TABLE 3

Melting Point with Various Percent Hard Segments

| TPU-ID | Diisocyanate | Polyol | Chain Extender | % HS | Melting Point (peak, ° C.) |
|---|---|---|---|---|---|
| TPU-35 | HDI | UH100 | CHDM | 20 | 121.6 |
| TPU-36 | HDI | UH100 | CHDM | 25 | 108 |
| TPU-9 | HDI | UH100 | CHDM | 30 | 116 |
| TPU-37 | HDI | UH100 | CHDM | 40 | 131.6 |
| TPU-38 | HDI | UH100 | CHDM | 50 | 147.5 |
| TPU-39 | HDI | UH100 | 1,6-HD | 20 | 116 |
| TPU-40 | HDI | UH100 | 1,6-HD | 25 | 108 |
| TPU-10 | HDI | UH100 | 1,6-HD | 30 | 118 |
| TPU-41 | HDI | UH100 | 1,6-HD | 40 | 135 |
| TPU-42 | HDI | UH100 | 1,4-BD | 20 | 111.2 |
| TPU-43 | HDI | UH100 | 1,4-BD | 25 | 111.6 |
| TPU-11 | HDI | UH100 | 1,4-BD | 30 | 129 |
| TPU-44 | HDI | UH100 | 1,4-BD | 40 | 143 |

% HS refers to the percent Hard Segment, calculated as the sum of wt % of Diisocyanate with chain extenders.

As can be seen in Table 3, generally the higher the % hard segment, the higher the crystallinity and the melting point.

Example 5—Mechanical Properties

Various thermoplastic polyurethanes were prepared. The thermoplastic polyurethanes were cut into small pellets and injection molded into a "dog bone" configuration for mechanical testing using an Instron® instrument. Specifically, the dog bone shape was selected in accordance with ASTM D638 Type V testing protocol. The dog bone samples had an overall length of about 63.5 mm. Symmetrical end portions of the dog bone samples had a width of about 9.53 mm and a length of about 18.58 mm with a narrow portion therebetween having a length of about 9.53 mm and a width of about 3.18 mm. The molded dog bone pieces were tested for tensile stress at maximum load and percent strain at break (typically at the narrow central portion). Results are presented in Table 4 below:

TABLE 4

Mechanical Testing

| Specimen ID | NCO | Polyol | Chain Extender | % HS | Melting Point (peak, ° C.) | Tensile stress at Maximum Load (MPa) | % Strain at Break |
|---|---|---|---|---|---|---|---|
| TPU-42 | HDI | UH100 | BD | 20 | 111 | 30.2 | 2612.6 |
| TPU-45 | HDI | UM90 | CHDM | 25 | 125.6 | 24.6 | 1964.5 |
| TPU-46 | HDI | UM90 | CHDM | 30 | 113.3 | 33 | 1462.6 |
| TPU-15 | HDI | UM90 | BD | 30 | 111.6 | 22.8 | 1406.9 |
| TPU-14 | HDI | UM90 | HD | 30 | 113.7 | 28.3 | 1317.8 |
| TPU-47 | HDI | PH200D | BD | 30 | 142.5 | 27.9 | 1312.2 |
| TPU-48 | HDI | PTMG2K | HD | 30 | 136.7 | 24.2 | 1293.3 |
| TPU-49 | HDI | PH300D | BD | 30 | 146 | 26.5 | 1259.7 |
| TPU-50 | HDI | PTMG2K | CHDM | 30 | 143.5 | 28.7 | 1162.5 |
| TPU-51 | HDI | PH200D | HD | 30 | 134.8 | 29.3 | 1095.1 |
| TPU-52 | HDI | PTMG1K | CHDM | 30 | 123.4 | 29.1 | 1065.7 |
| TPU-53 | HDI | PH200D | CHDM | 30 | 129 | 20.3 | 1058.7 |
| TPU-38 | HDI | UH100 | CHDM | 50 | 147.5 | 17 | 320 |
| TPU-37 | HDI | UH100 | CHDM | 40 | 131.6 | 14 | 362 |
| TPU-44 | HDI | UH100 | 1,4-BD | 40 | 143.1 | 18.6 | 400 |
| TPU-54 | HDI | PH100 | CHDM | 40 | 137 | 21.7 | 581 |

NCO is an abbreviation for diisocyanate.
% HS refers to the percent Hard Segment, calculated as the sum of wt % of Diisocyanate with chain extenders.
ETERNACOLL ® PH200D (MW = 2000) and PH300D (MW = 3000) are liquid polycarbonate polyols from UBE Chemical, Japan; and PTMG2K is a poly(tetrahydrofuran) with a MW of 2000 commercially available from Mitsubishi Chemical Corporation, Japan.

As can be seen from Table 4, the thermoplastic polyurethane molds that had the best mechanical performance were those having a hard segment between 20% and 30%.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A materials kit for three-dimensional (3D) printing comprising:
  a powder bed material comprising thermoplastic polyurethane particles having an average particle size from about 20 µm to about 120 µm and a melting temperature of from about 100° C. to about 250° C., wherein the thermoplastic polyurethane particles include polyurethane polymer strands having an average of about 10 wt % to about 30 wt % hard segments based on a total weight of the thermoplastic polyurethane particles, the hard segments including a symmetrical aliphatic diisocyanate and a symmetrical aliphatic chain extender that are polymerized into the thermoplastic polyurethane particles; and
  a fusing agent comprising a radiation absorber to selectively apply to the powder bed material.

2. The materials kit of claim 1, wherein the polyurethane polymer strands have a weight average molecular weight of from about 50,000 Mw to about 1,000,000 Mw.

3. The materials kit of claim 1, wherein the symmetrical aliphatic diisocyanate has a structure:

$$O=C=N-R_1-N=C=O$$

where $R_1$ is a saturated linear or cyclic alkyl group having an even number of carbon atoms from 2 to 12.

4. The materials kit of claim 1, wherein the symmetrical aliphatic diisocyanate comprises 1,6-hexanediisocyanate, 1,4-cyclohexyldiisocyanate, or a combination thereof.

5. The materials kit of claim 1, wherein the symmetrical aliphatic chain extender has a structure:

$$HO-R_2-OH$$

where $R_2$ is a saturated linear or cyclic alkyl group having an even number of carbon atoms from 2 to 12.

6. The materials kit of claim 1, wherein the symmetrical aliphatic chain extender comprises 1,4-butanediol, 1,6-hexanediol, 1,4-cyclohexyldimethylol, or a combination thereof.

7. The materials kit of claim 1, wherein the thermoplastic polyurethane particles further comprise polyurethane polymer strands having a soft segment polymerized from poly(tetrahydrofuran) polyol, poly(carbonate) polyol, poly(ester-co-carbonate) polyol, polyester polyol, polybutadiene polyol, and poly(isobutylene) polyol, or a combination thereof.

8. A materials kit for 3D printing comprising:
  a powder bed material comprising thermoplastic polyurethane particles having an average particle size from about 20 µm to about 120 µm and a melting temperature of from about 100° C. to about 250° C., and wherein the thermoplastic polyurethane particles include polyurethane polymer strands having an average of about 10 wt % to about 30 wt % hard segments based on a total weight of the thermoplastic polyurethane particles, the hard segments including a symmetrical aliphatic diisocyanate and a symmetrical aliphatic chain extender that are polymerized into the thermoplastic polyurethane particles; and a fusing agent comprising a radiation absorber to selectively apply to the powder bed material; and a detailing agent comprising a detailing compound to selectively apply to the powder bed material.

9. The materials kit of claim 8, wherein the thermoplastic polyurethane particles comprise from about 80 wt % to about 100 wt % of the powder bed material based on a total weight of the powder bed material.

10. The materials kit of claim 8, wherein the radiation absorber comprises carbon black, a near-infrared absorbing dye, a near-infrared absorbing pigment, a tungsten bronze, a molybdenum bronze, metal nanoparticles, a conjugated polymer, or a combination thereof.

11. The materials kit of claim 8, wherein the detailing compound is capable of reducing a temperature of polymer powder onto which the detailing agent is applied when the powder bed material is exposed to photoactive energy photochemically interactive with the radiation absorber.

12. A method of making a 3D printed article comprising:
iteratively applying individual build material layers of thermoplastic polyurethane particles to a powder bed, the thermoplastic polyurethane particles having an average particle size from about 20 μm to about 120 μm and a melting temperature of from about 100° C. to about 250° C., and wherein the thermoplastic polyurethane particles include polyurethane polymer strands having an average of about 10 wt % to about 30 wt % hard segments based on a total weight of the thermoplastic polyurethane particles, the hard segments including a symmetrical aliphatic diisocyanate and a symmetrical aliphatic chain extender that are polymerized into the thermoplastic polyurethane particles;

based on a 3D object model, selectively jetting a fusing agent onto individual build material layers, where the fusing agent comprises a radiation absorber; and exposing the powder bed to electromagnetic energy to selectively fuse the thermoplastic polyurethane particles in contact with the radiation absorber at individual build material layers to form a 3D printed article.

13. The method of claim 12, further comprising selectively jetting a detailing agent onto individual build material layers at a location adjacent to the fusing agent where fusing is not desired based on the 3D object model, where the detailing agent comprises a detailing compound.

14. The method of claim 12, wherein the symmetrical aliphatic diisocyanate includes 1,6-hexanediisocyanate, 1,4-cyclohexyldiisocyanate, or a combination thereof and the symmetrical aliphatic chain extender includes 1,4-butanediol, 1,6-hexanediol, 1,4-cyclohexyldimethylol, or a combination thereof.

15. The method of claim 12, wherein the 3D printed article has a tensile strength of from about 20 MPa to about 50 MPa and a percent elongation at break of from about 1000% to about 4000%.

* * * * *